United States Patent
Park et al.

(10) Patent No.: US 10,508,585 B2
(45) Date of Patent: Dec. 17, 2019

(54) EXHAUST MANIFOLD MOUNTING STRUCTURE FOR ENGINE

(71) Applicants: HYUNDAI MOTOR COMPANY, Seoul (KR); KIA MOTORS CORPORATION, Seoul (KR)

(72) Inventors: Jungjoo Park, Gunpo-si (KR); Il Suk Yang, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 235 days.

(21) Appl. No.: 15/661,799

(22) Filed: Jul. 27, 2017

(65) Prior Publication Data
US 2018/0163606 A1 Jun. 14, 2018

(30) Foreign Application Priority Data
Dec. 14, 2016 (KR) .................. 10-2016-0170468

(51) Int. Cl.
*F01N 13/18* (2010.01)
*F01N 13/10* (2010.01)

(52) U.S. Cl.
CPC ......... *F01N 13/1805* (2013.01); *F01N 13/10* (2013.01); *F01N 13/1855* (2013.01); *F01N 2450/22* (2013.01); *F01N 2450/24* (2013.01)

(58) Field of Classification Search
CPC .... F01N 3/1805; F01N 13/10; F01N 13/1855; F01N 2450/22; F01N 2450/24
See application file for complete search history.

(56) References Cited

U.S. PATENT DOCUMENTS

| | | | | |
|---|---|---|---|---|
| 2,954,763 A | * | 10/1960 | Malcolm | F01N 13/00 123/195 R |
| 3,374,775 A | * | 3/1968 | Ferguson | F02M 1/00 123/184.38 |
| 4,214,444 A | * | 7/1980 | Fujioka | F01N 13/1811 277/591 |
| 6,555,070 B1 | * | 4/2003 | Kruger | F01N 3/2853 422/177 |
| 6,789,386 B1 | * | 9/2004 | Haerle | F01N 3/2842 277/591 |
| 2005/0268602 A1 | * | 12/2005 | Smatloch | F01N 13/10 60/323 |

FOREIGN PATENT DOCUMENTS

| | | |
|---|---|---|
| KR | 20-0191958 Y1 | 8/2000 |
| KR | 10-1585226 B1 | 1/2016 |
| KR | 10-1598377 B1 | 3/2016 |

* cited by examiner

*Primary Examiner* — Patrick D Maines
(74) *Attorney, Agent, or Firm* — Morgan, Lewis & Bockius LLP

(57) ABSTRACT

An exhaust manifold mounting structure for an engine includes: a bolt fixed to the engine; a flange integrally formed with the exhaust manifold or disposed inside the exhaust manifold and including a bolt hole through which the bolt penetrates; a nut engaged with the bolt that penetrates the flange; and a loosening prevention plate through which the bolt penetrates, and which is disposed between the nut and the flange. The loosening prevention plate extends in a length direction of the flange.

4 Claims, 3 Drawing Sheets

EXHAUST MANIFOLD MOUNTING STRUCTURE FOR ENGINE

CROSS-REFERENCE TO RELATED APPLICATION

This application claims the benefit of priority to Korean Patent Application No. 10-2016-0170468 filed in the Korean Intellectual Property Office on Dec. 14, 2016, the entire content of which is incorporated herein by reference.

TECHNICAL FIELD

The present disclosure relates to an exhaust manifold mounting structure for an engine. More particularly, the present disclosure relates to an exhaust manifold mounting structure for an engine for preventing leakage.

BACKGROUND

In general, in a combustion chamber of an internal combustion engine, a mixed gas is burned, and the internal combustion engine operates with energy occurring by a combustion heat.

An internal combustion engine is generally applied to an engine of a vehicle, and as the internal combustion engine, in order to increase the output of the engine and to reduce noise and a vibration, a multi-cylinder engine having a plurality of cylinders is generally used.

In such a multi-cylinder engine, an intake manifold, which is a path that guides an intake gas that is transferred from an intake path to each cylinder and an exhaust manifold, which is a path that collects an exhaust gas that is discharged from each cylinder and that transfers the exhaust gas to an exhaust path are mounted.

The intake manifold and the exhaust manifold are essential constituent elements of the multi-cylinder engine, and when air-tightness of the intake manifold and the exhaust manifold are not maintained, it may have a bad influence on stability and efficiency of the engine.

The above information disclosed in this Background section is only for enhancement of understanding of the background of the invention and therefore it may contain information that does not form the prior art that is already known in this country to a person of ordinary skill in the art.

SUMMARY

The present disclosure has been made in an effort to provide an exhaust manifold mounting structure for an engine in which air-tightness is guaranteed.

According to an exemplary embodiment of the present disclosure, an exhaust manifold mounting structure for an engine includes: a bolt fixed to the engine; a flange integrally formed with the exhaust manifold and comprising a bolt hole through which the bolt penetrates; a nut engaged with the bolt that penetrates the flange; and a loosening prevention plate through which the bolt penetrates and which is disposed between the nut and the flange. The loosening prevention plate extends in a length direction of the flange.

A length of the loosening prevention plate may vary according to a specification of the engine.

The loosening prevention plate may include an engagement portion fixed by engagement of the bolt and the nut between the nut and the flange; an engagement hole punched in the engaging portion, so that the bolt penetrates through the engagement hole; and an extension extending in a length direction of the flange from the engaging portion.

An extended end portion of the extension may be welded to the flange.

The engaging portion may be disposed at a rearmost bolt hole of the flange, and the extension may extend from the engaging portion toward a front side.

A thickness of the loosening prevention plate may be 2 mm.

DETAILED DESCRIPTION OF THE EMBODIMENTS

An exemplary embodiment of the present disclosure will hereinafter be described in detail with reference to the accompanying drawings.

Figure 1:
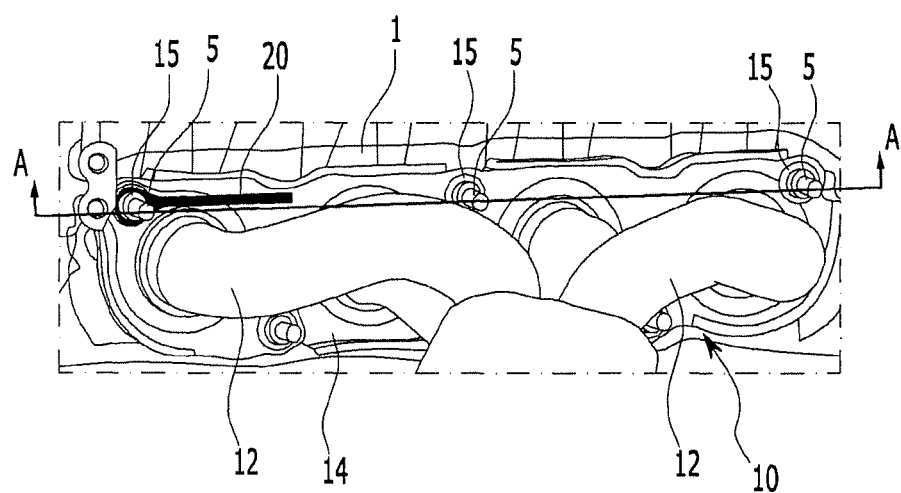
FIG. 1 is a perspective view of an exhaust manifold mounting structure for an engine according to an exemplary embodiment of the present disclosure.
Figure 2:
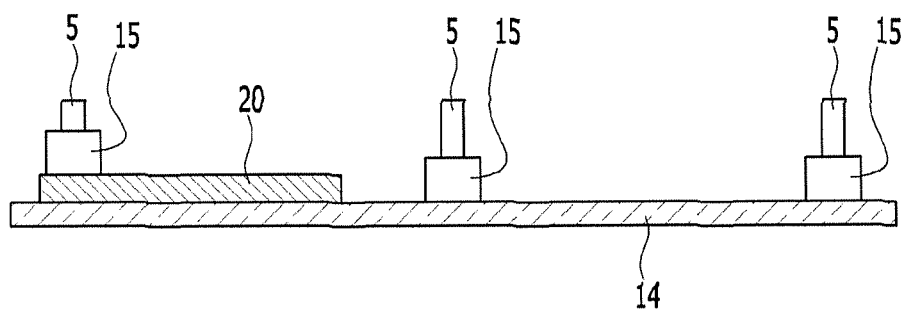
FIG. 2 is a cross-sectional view taken along line A-A of FIG. 1.

FIG. 1 is a perspective view of an exhaust manifold mounting structure for an engine according to an exemplary embodiment of the present disclosure, and FIG. 2 is a cross-sectional view taken along line A-A of FIG. 1.

As shown in FIGS. 1 and 2, an exhaust manifold mounting structure for an engine according to an exemplary embodiment of the present disclosure is a structure for mounting an exhaust manifold 10 in an engine 1 and includes a bolt 5, a flange 14, a nut 15, and a loosening prevention plate 20.

When the engine 1 is a multi-cylinder engine, the exhaust manifold 10 is a path that collects an exhaust gas that is discharged from each cylinder (not shown) and that transfers the exhaust gas to an exhaust path and will become apparent to a person of ordinary skill in the art and therefore a detailed description thereof will be omitted.

FIG. 1 illustrates a four-cylindered engine 1 having four cylinders, but the present invention is not limited thereto. For example, even in a single-cylindered engine 1, an exhaust manifold mounting structure for an engine according to an exemplary embodiment of the present disclosure may be applied to a structure that mounts a constituent element that transfers an exhaust gas that is discharged from a cylinder to an exhaust path in the engine 1, as in the exhaust manifold 10.

The exhaust manifold 10 that is mounted in the multi-cylinder engine 1 is configured with runners 12 of the same number as that of a plurality of cylinders. In order to receive an exhaust gas, one ends of the plurality of runners 12 each communicate with one cylinder, and in order to communicate with an exhaust path, the other ends of the plurality of runners 12 are converged to one.

The bolt 5 may be a stud bolt which is semi-permanently coupled to the engine 1. That is, the bolt 5 is fixed to the engine 1. Coupling of such a stud bolt 5 may be implemented with a method such as welding. Further, the bolt 5 protrudes opposite to the exhaust manifold 10 that is mounted in the engine 1.

The flange 14 is provided in a connection portion of pipe fittings. Further, the flange 14 is formed in a wide plate shape. Further, the flange 14 is integrally formed with the exhaust manifold 10 or is provided in the exhaust manifold 10.

In a state in which the bolt 5 penetrates the flange 14, the nut 15 is engaged with the bolt 5. Therefore, the exhaust manifold 10 is mounted in the engine 1.

The exhaust manifold 10 contacts a high temperature of exhaust gas to be thermally deformed. Particularly, one ends of the plurality of runners 12 that receive an exhaust gas from the cylinder may be relatively largely thermally deformed. Thermal deformation of one end of the runner 12 that is disposed at both end sides of the flange 14 may cause thermal deformation of both end portions of the flange 14 having a relatively weak bonding force. Therefore, at both end sides of the flange 14, the nut 15 that is engaged with the bolt 5 may be loosed. In order to overcome such a problem, the loosening prevention plate 20 is provided.

Here, both end portions of the flange 14 mean the foremost and the rearmost, the front side and the rear side mean the front side and the rear side of the vehicle, and it will become apparent to a person of an ordinary skill in the art that a plurality of cylinders are generally arranged in the front-rear direction. For convenience of description, such front and rear sides are defined in a length direction.

The loosening prevention plate 20 is provided between the nut 15 and the flange 14. Further, by penetrating the loosening prevention plate 20, the bolt 5 is engaged with the nut 15. In FIG. 1, one loosening prevention plate 20 is illustrated, but the present invention is not limited thereto. However, when the number of the loosening prevention plate 20 is minimized, the loosening prevention plates 20 may be provided in both end portions of the flange 14 in an arrangement direction of the plurality of runners 12. Particularly, when the number of the loosening prevention plate 20 is limited to one, the loosening prevention plate 20 may be provided at the rearmost runner 12 side.

Figure 3:
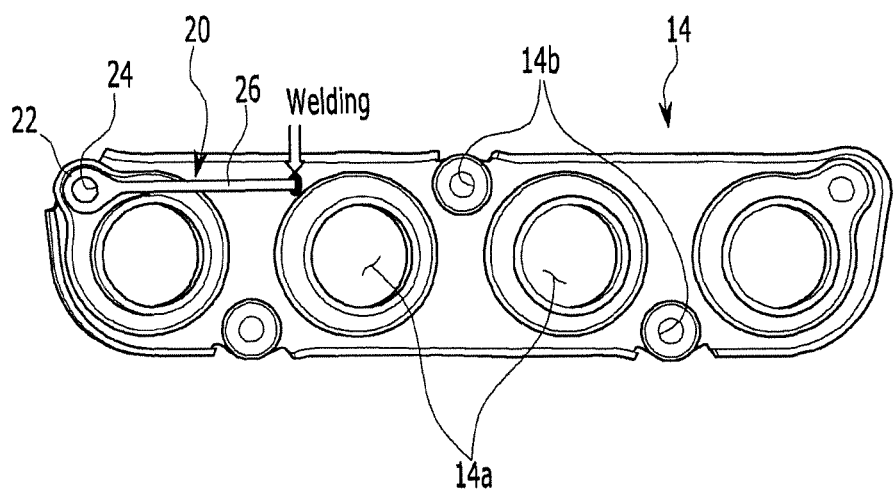
FIG. 3 is a schematic diagram of a flange according to an exemplary embodiment of the present disclosure.

FIG. 3 is a schematic diagram of a flange according to an exemplary embodiment of the present disclosure.

As shown in FIG. 3, the flange 14 includes a communication hole 14a and a bolt hole 14b, and the loosening prevention plate 20 includes an engaging portion 22, an engagement hole 24, and an extension 26.

In order to communicate a cylinder and the runner 12, the communication hole 14a is punched in the flange 14. That is, the communication hole 14a is formed with the same number as that of the runner 12.

In order to penetrate the bolt 5, the bolt hole 14b is punched in the flange 14. Further, at least two bolt holes 14b are formed, and the number thereof may be changed according to a design of a person of an ordinary skill in the art. Further, as the number of the runners 12 and cylinders increases, when the flange 14 is extended in a length direction, the number of the bolt holes 14b may increase.

The engaging portion 22 is fixed by engagement of the bolt 5 and the nut 15 between the nut 15 and the flange 14. Further, when the loosening prevention plate 20 is provided at the rearmost runner 12 side, the engaging portion 22 is disposed at a rearmost bolt hole 14b of the flange 14.

The engagement hole 24 is punched in the engaging portion 22 in order to penetrate the bolt 5. That is, by sequentially penetrating the bolt hole 14b and the engagement hole 24, the bolt 5 is engaged with the nut 15. Further, the engagement hole 24 may be formed in a size corresponding to that of the bolt hole 14b.

The extension 26 is extended in a length direction of the flange 14 from the engaging portion 22. Further, when the engaging portion 22 is disposed at the rearmost bolt hole 14b of the flange 14, the extension 26 is extended from the engaging portion 22 toward the front side. When the engaging portion 22 is disposed at the foremost bolt hole 14b of the flange 14, the extension 26 may be extended from the engaging portion 22 toward the rear side. Further, an extended end portion of the extension 26 is welded to the flange 14.

A length of the loosening prevention plate 20 that is determined with an extended length of the extension 26 may be set by a design of a person of an ordinary skill in the art according to a specification of the engine 1, and a thickness of the loosening prevention plate 20 may be 2 mm.

As described above, according to an exemplary embodiment of the present disclosure, an exhaust gas can be prevented from being leaked by a change of the exhaust manifold 10. Further, as air-tightness of the exhaust manifold 10 is secured, stability and efficiency of the engine 1 can be improved.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. An exhaust manifold mounting structure for an engine, the exhaust manifold mounting structure comprising:
    a bolt fixed to the engine;
    a flange integrally formed with the exhaust manifold and comprising a bolt hole through which the bolt extends;
    a nut engaged with the bolt that extends the flange; and
    a loosening prevention plate through which the bolt extends and which is disposed between the nut and the flange,
    wherein the loosening prevention plate extends in a length direction of the flange,
    wherein the loosening prevention plate comprises:
        an engaging portion fixed by engagement of the bolt and the nut between the nut and the flange;
        an engagement hole in the engaging portion so that the bolt extends through the engagement hole; and
        an extension that extends in a length direction of the flange from the engaging portion, and
    wherein an extended end portion of the extension is welded to the flange.

2. The exhaust manifold mounting structure of claim 1, wherein a length of the loosening prevention plate varies according to a specification of the engine.

3. The exhaust manifold mounting structure of claim 1, wherein the engaging portion is disposed at a rearmost bolt hole of the flange, and the extension extends from the engaging portion toward a front side.

4. The exhaust manifold mounting structure of claim 1, wherein a thickness of the loosening prevention plate is 2 mm.

* * * * *